Figure 1:
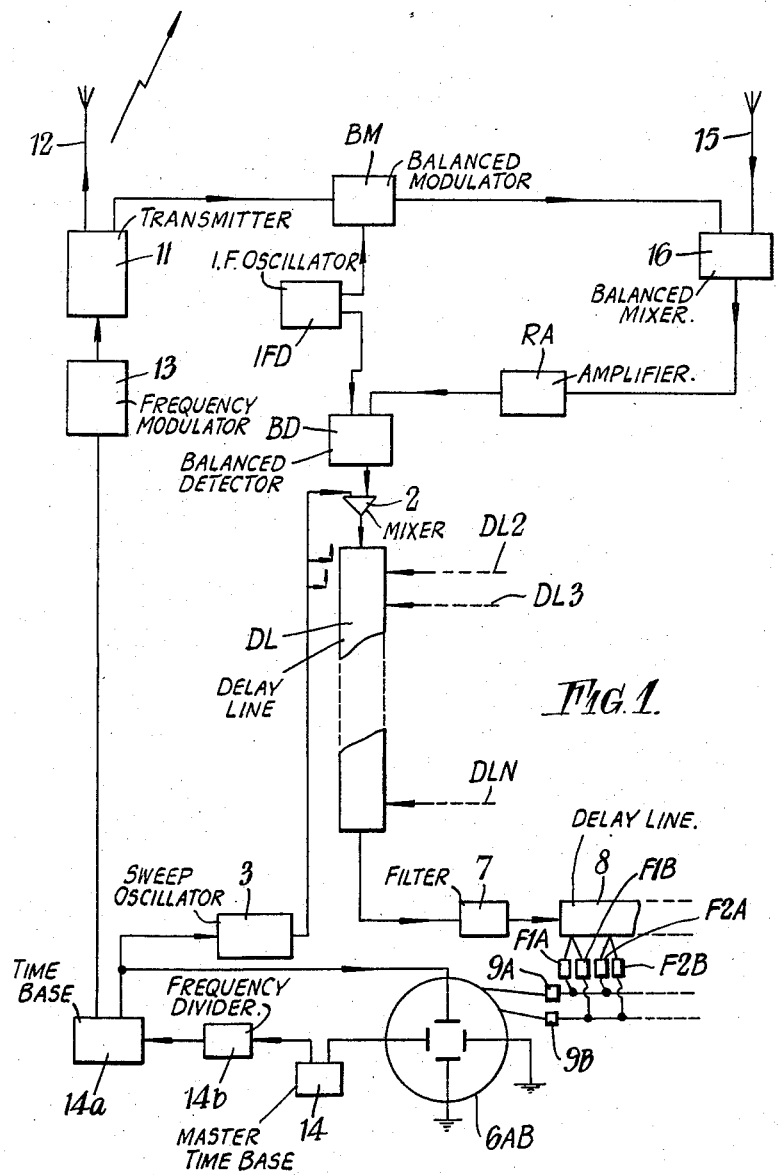

United States Patent Office 2,933,725
Patented Apr. 19, 1960

2,933,725
RADAR SYSTEMS

Peter Maurice Wright and Percy Samuel Brandon, Chelmsford, England, assignors to Marconi's Wireless Telegraph Company Limited, London, England, a company of Great Britain Application April 15, 1955, Serial No. 501,751

2 Claims. (Cl. 343—14)

This application is a continuation-in-part of our co-pending application Serial No. 386,008, filed October 14, 1953, now abandoned.

This invention relates to radar systems and more specifically to frequency modulated (F.M.) Doppler frequency and similar radar systems of the kind in which received echo signals are converted into beat frequencies which lie within a predetermined band which has to be analyzed to separate the beat frequencies corresponding to the various targets from which the echo signals are reflected and thus to enable the said targets to be displayed on a cathode ray tube.

The main object of the present invention is to increase the information given by the display of a radar system of the kind referred to by adding color to the display to provide, by that color, information as to target motion in relation to the radar system, this information being additional to the target information given by the positions of target indications in the display. Thus, as applied to a system giving a P.P.I. display—i.e. a display in which the azimuth of a target is indicated by the direction of the target indication from the center of the display and the range of said target is indicated by the distance of said indication from said center—the present invention enables the provision, in addition, of information about target relative motion, this additional information being conveyed by the color of the display. It will be at once appreciated that this is of great practical advantage.

In an ordinary F.M. radar system in which target echoes are used to produce beat notes with transmitted energy, if the beat note energy occurring over a sufficient number of transmitter repetition periods is observed (e.g. in the usual case in which the transmitted frequency is modulated in accordance with a saw tooth law, if the beat note energy occurring over a number of succesive saw teeth is observed), the energy will be found to be concentrated in discrete frequency bands. If the target has no radial velocity relative to the radar system, these discrete bands occur around the transmitter repetition frequency and integral multiples thereof. If the target has radial velocity with respect to the radar system these bands become shifted by an amount dependent upon said velocity, i.e. by a frequency corresponding to the Doppler shift frequency, the direction of the shift being dependent upon whether the target is moving away from or towards the system. The present invention uses this phenomenon, which is known per se, to achieve its objects.

In any F.M. radar system producing beat notes as above described it is, of course, necessary to analyze the spectrum of beat notes obtained to derive signals for display. Broadly speaking there are two classes of frequency spectrum analyzers for use in such F.M. radar systems. In the first class, generally termed "panoramic" spectrum analyzers, the echo signals, or signals derived therefrom, are mixed with oscillations from a sweeping oscillator the oscillations of which are frequency modulated (usually in accordance with a saw tooth law) and the signals resulting from mixing are fed to a band pass filter of fixed predetermined pass frequency and narrow predetermined band width. In effect, therefore, the combination of mixer and sweeping oscillator sweeps the incoming signal band (more accurately, a band derived therefrom) across the pass band of the filter. The defect of this class of analyzer is the time taken to analyze the signal band. In the other class of analyzers—usually and herein called the multi-analyzer class—the whole band of signals, or, in usual practice, a band derived therefrom by heterodyning, is fed to a plurality of separate filters of different, adjacent, pass bands, which between them cover the whole band, the more the number of filters provided the greater the resolution. This class of analyzer effects analysis in the shortest possible time but has the defect of complexity for the means necessary for displaying the separated signals resulting from analysis are considerably more complex than the comparatively simple means which are all that are necessary with the panoramic type of analyzers.

The present invention makes use of a newly conceived frequency spectrum analyzer which forms the subject of the invention contained in co-pending application Ser. No. 385,830, filed October 13, 1953, now Patent No. 2,897,442. According to the invention contained in the said co-pending application, a frequency spectrum analyzer comprises a mixer in which are mixed signals within a band of frequencies to be analyzed and locally generated oscillations from a frequency modulated sweeping oscillator. The frequency deviation of the sweeping oscillator is approximately equal to the width of the band of frequencies to be analyzed. A dispersive network is fed with the output from the mixer and is adapted to convert the frequency modulated trains which constitute the output into signal pulses or bursts of signals occurring at times with respect to the occurrence of the trains at the input of the dispersive network that are dependent on the signal frequencies in the band. For the sake of brevity in description a frequency spectrum analyzer in accordance with the invention in said copending application will be termed hereinafter a "dispersive spectrum analyzing means."

The dispersive network converts the frequency modulated signal trains which constitute the output of the mixer into pulses which occur at times dependent on the signal frequency.

A convenient form of display arrangement for the output from the dispersive network comprises a cathode ray tube having one coordinate deflection supplied from said output and the other synchronized with the sweeping oscillator.

A preferred form of dispersive network consists of a tapped artificial delay line and a plurality of narrow band filters with adjacent pass bands each connected to a different tapping on the line and all feeding a common output circuit, the arrangement being such that the delay imposed on any frequency fed to the output (in relation to the occurrence of that frequency in the input to the network) is a suitable function of the frequency in question.

The specification accompanying co-pending application Ser. No. 385,998, filed October 14, 1953, now abandoned, describes an invention in which use is made of dispersive spectrum analyzing means in accordance with application Ser. No. 385,830, there being a plurality (N) of differently directed receiver heads, each covering a different portion of a volume in space to be "watched." A common delay line is fed with the resultants of mixing signals derived from all the heads with the outputs from sweep oscillator means which sweep through N times the relevant beat note frequency range in one repetition period. The line delivers these resultants to a common output circuit with different delays for the different heads, the delays imposed on the resultants corresponding to adjacent heads differing by 1/Nth of the repetition period. A dispersive network is fed from the common output circuit. The indicator is a cathode ray display tube, the beam in which is deflected in one direction at a frequency equal to the predetermined repetition frequency and in the other direction at a frequency equal to N times the repetition frequency. The signals derived from the dispersive network are applied to control the intensity of the ray in the display tube. The dispersive spectrum analyzer consists of the dispersive network, the sweep oscillator and the means for mixing the signals from the heads with outputs from the oscillator means constituting dispersive spectrum analyzer means. In the particular arrangement described and shown in co-pending application Ser. No. 385,998, the common output circuit feeds into a tapped second delay line which in turn feeds the display tube through filters connected to the taps on said second line.

According to this invention in its broadest aspect an F.M. radar system wherein beat notes are analyzed by dispersive spectrum analyzing means including at least one set of frequency separating filters supplying signals for display is characterized in that, instead of only one set of filters there are at least two sets of filters of which corresponding filters differ in frequency response so as to pass signals due to targets of different radial velocities, each set being employed to control a different component color in a colored display whereby the color of a target indication in said display gives indication of the corresponding target radial velocity.

In a preferred embodiment of the invention a radar system comprises at least one frequency modulated transmitter adapted to transmit continuous waves which are frequency modulated in accordance with a predetermined periodic law repeating itself at a predetermined repetition frequency, a plurality (N) of differently directed receiver heads, each covering a different portion of a volume in space to be "watched," a common delay line fed with the resultants of mixing signals derived from all said heads with outputs from sweep oscillator means arranged to sweep through N times the relevant beat-note frequency range thereof in one repetition period, said line delivering said resultants to a common output circuit with different delays for the different heads, the delays imposed on the resultants corresponding to adjacent heads differing by 1/Nth of the period of said repetition frequency, and a dispersive network fed from said common output circuit, said network feeding frequency separating means including a plurality of sets of filters, the filters of one set being fed in parallel with the corresponding filters of the other or others, filters fed in parallel differing in frequency response so that they will pass signals due to targets of different radial velocities relative to the system and display means each controlled by the output from a different set of filters and adapted to produce a colored display composed of component colors each color component being controlled by the output from a different set of filters.

Each set of filters may be used to control its own differently colored display tube and the tubes arranged to superimpose their displays optically to produce the final display. Alternatively a multi-colored display tube of the color television type with separate control means for each color may be used, each set of filters controlling a different one of said control means.

Figure 2:
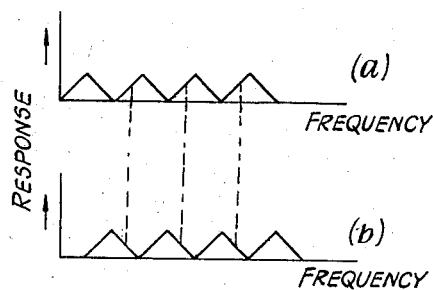
Figure 3:
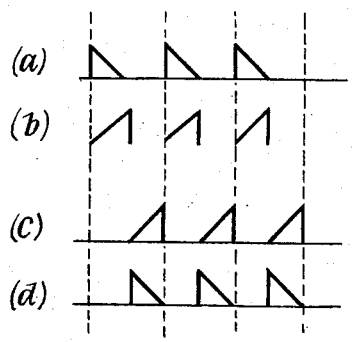

The invention is illustrated in and further explained in connection with the accompanying drawings, in which Fig. 1 is a diagram of a preferred embodiment and Figs. 2 and 3 are explanatory graphical figures.

Fig. 1 shows diagrammatically one form of multi-head radar installation embodying the invention. For simplicity in drawing only one head is indicated, the connections of the others being similar to that shown. The system of Fig. 1 employs a spectrum analyzer in accordance with the invention contained in the co-pending application Ser. No. 385,998 to analyze the beat notes to determine the range of targets, the sweeping oscillator being arranged to sweep through N times the relevant beat-note frequency range in one period, N being the number of radar heads. The outputs of the heads after mixing with outputs from a sweep oscillator are combined in parallel by means of a delay line which delays the resultant corresponding to each head with relation to that of its neighbor by 1/Nth of the transmitter repetition period so that, in one complete period, there are N range sweeps, one for each head. Although, in the particular case now being described azimuth and range of targets are determined—azimuth from knowledge of the head in effective use at any time and range from range sweeping—it will be obvious later that the system to be described could easily be adapted to ascertain azimuth and altitude, or azimuth and elevation.

Referring to Fig. 1, a so-called "flood-lighting" transmitting aerial 12 is fed from a transmitter 11 which is frequency modulated by a saw tooth modulator 13 which is controlled by a time base 14a at the required transmitter repetition frequency $f_r$ the transmitted frequency being varied between limiting frequencies such as to produce a range of beat notes between $f_a$ and $f_b$ c./s. As shown this time base is driven by a frequency divider 14b which divides by the factor N (the number of receiving heads in the system) the output from a master time base 14 operating at N times the required repetition period. The time base 14 consists of a sine wave oscillator operating at a frequency of $Nf_r$, whose output is converted into square waves, in a conventional manner. The square waves are passed through a differentiating network and the derived negative going pulses are removed. The positive going pulses are then used to synchronize a conventional saw-tooth generator of the same frequency $Nf_r$. The said positive going pulses are also fed to the frequency divider 14b, which is a counter type of divider, well known per se, and the output therefrom, consisting of positive going pulses of frequency $f_r$, are used to synchronize time base 14a, which is also a conventional saw-tooth generator. Each of the N receiving heads (only one is shown) comprises a receiving aerial 15, a balanced mixer 16, a balanced modulator BM, an amplifier RA, a balanced detector BD and an intermediate frequency oscillator IFD. The receiving heads are differently oriented in azimuth in the usual way in multi-head systems, e.g. there might be 50 heads each covering 1° of azimuth, the aerial 12 covering the whole 50°. The balanced mixer 16 receives one input from the aerial 15 and the other from the balanced modulator BM; the said modulator BM receives one input direct from the transmitter 11 and the other from the oscillator IFD; and the balanced detector BD receives one input from said oscillator IFD and the other from the amplifier RA which is fed from the mixer 16. As so far described the system is as known.

The outputs from the detectors BD (of which there are N), are mixed in mixer 2 (of which there are also N), with outputs from a sweep oscillator 3, which has a frequency deviation of $N(f_1-f_2)$ where $(f_1-f_2)$ is numerically equal to $f_a-f_b$), and fed to different taps on a delay line DL which is so designed and the taps on which are so chosen that the resultant signals corresponding to adjacent heads arrive at the end of the line delayed by periods $$\frac{1}{Nf_r}, \frac{2}{Nf_r}, \frac{3}{Nf_r} \cdots$$

and so on, where $f_r$ is the transmitter repetition frequency. The various inputs for the mixed resultants to the line DL are indicated at $DL_1$, $DL_2$, $DL_3$ ... $DL_N$. The second mixer 2 has applied to it the oscillations from the sweep generator 3 and the output from the second balanced detector BD. The purpose of the sweep oscillator is to sweep across the mixers with the object of producing an output which is a function of the best frequency which is developed in the balanced detector BD, and the original sweep oscillator frequency. The output of this mixer is applied to the delay line DL which delays the signals from the different heads which are applied to the delay line through their respective mixers so that the signals from these mixers are applied to the output filter 7 in the correct time sequence. By this means a plurality of separate signals resulting from the echo signals from separate receiver heads may be received during any given transmitter repetition period. The significance of this arrangement is that if DL were not employed a large part of the transmitter repetition period would be unused because the range information may well be provided in one short period representing a very small fraction of the transmitter repetition period. However, owing to the use of the sweep oscillation generator 3 the voltage applied to the mixers 2 sweeps across these so that the series of signals from the heads are suitably delayed to provide the discrete signals at the correct time sequence at the filter 7.

The information emerging from the delay line is the intelligence from the different heads in sequence, information from all the heads being contained within one transmitter repetition period. This is applied through filter 7 to the dispersive network which includes the tapped delay line 8 and two sets of filters, the latter providing signals, whose relative time relationship with the output of time base 14 are dependent on target range, for brightening up the display in two distinct color indications on the display tube. Thus, as the display tube is scanned in the horizontal direction at a frequency of $Nf_r$, and in the vertical direction at a frequency of $f_r$, and during one transmitter repetition period signals, derived from the echo signals from each receiver head in turn, are applied to brighten up the display tube, then that horizontal scan (of the N horizontal scans) on which the target is shown defines the receiver head from which the target information was derived, and therefore defines the azimuth of the target. At the same time the position of the tube indication along the length of the horizontal scan defines the target range.

The sweep oscillator 3 has a frequency deviation of $N(f_1-f_2)$ where $f_1-f_2$ is numerically equal to $f_a-f_b$ and is synchronized by the time base 14 being actually controlled from unit 14a. It is assumed here that the oscillator 3 is not amplitude modulated. If desired, however, and preferably, the sweeping oscillator may be amplitude modulated, though whether or not such modulation is used is entirely a matter of design choice since the modulation may be purely frequency and the individual oscillations may be all of the same amplitude. However, certain advantages (and disadvantages) are obtained if the sweeping oscillator amplitude is caused to fall away smoothly, preferably in accordance with a cosine squared law, from a maximum at the middle of the frequency sweep to minima at the beginning and end. The output from the delay line DL is passed through a filter 7 to a dispersive network and including the tapped delay line 8 and two sets of filters of which one set is marked F1A, F2A . . . and the other is marked F1B, F2B . . ., each filter being arranged to pass frequencies over a band of $f_r$ and the filters of each set having their pass bands separated by $f_r$. Except for the provision of two sets of filters instead of one, the system as so far described is exactly as in Fig. 1 of application Serial No. 385,998. In the embodiment now being described it is assumed that the filter 7 is a sum frequency filter though it will be understood that the filter 7 might be a difference frequency filter or might pass both sum and difference frequencies. The delay interval between adjacent taps on the line 8 is $$\frac{1}{N(f_2-f_1)}$$

Display is effected by a two color display tube 6AB which is fed from the unit 14a with a perpendicular coordinate of deflection at the transmitter repetition frequency $f_r$. The two rays in this tube are brightened up by signals from the two sets of filters, the set F1A . . . controlling one color production and the set F1B . . . controlling the other, the signals from these sets being rectified by rectifiers 9A, 9B and fed to the two control electrodes (not separately shown) of the two-color tube.

As previously pointed out, targets having a radial component of motion with relation to the system will produce Doppler shift of the beat note frequency bands situated, in the case of fixed targets, around multiples of the transmitter repetition frequency. This fact is used, in the embodiment of the invention now being described to provide a colored display in which targets of different velocities are displayed in different colors. To this end the corresponding filters of the two sets F1A . . ., F1B . . . are made of different frequency response over their pass ranges. Thus the response curves may be triangular and different in the sets as shown in the accompanying Fig. 2 at (a) for one set and (b) for the other. In Figure 2, the broken lines connecting (a) and (b) represent integral multiples of the transmitter repetition frequency. The outputs of the two sets of filters are fed (after rectification by rectifiers 9A, 9B) to the separate color terminals of the 2-color display tube 6AB. The resultant color will therefore depend on the relative amplitudes of the outputs from the two sets and the color of the target display for one moving object will be an indication of its radial velocity. Clearly three sets of filters with a three color display tube could be similarly employed.

The same idea may be used to give color distinction as between approaching and receding targets. Thus by using four sets of filters where, for example, each filter has a pass band of $f_r/2$, the separation between filters of each set being $f_r$, one with filters having response characteristics as shown at (a) in Fig. 3 and the others with filters having response characteristics as shown at (b), (c) and (d) respectively in Fig. 3 and feeding the outputs from the filters as represented at (a) and (b) to one color tube and the outputs from filters as represented at (c) and (d) to another color tube, approaching objects will be shown on one tube and receding objects on the other.

Again if there are two sets of filters, one taking only frequencies above the appropriate integral multiples of the transmitter repetition frequency and the others taking only frequencies below these multiples and the two sets of filters feed their outputs to two differently colored tubes—e.g. one red and one green—which are arranged in any convenient known manner to have their screens viewed in optical superimposition, approaching targets will be displayed in a different color from receding targets and be thus clearly distinguished therefrom.

Clearly, instead of using a two (or three) color tube as in Fig. 1, separate tubes, each single color and each controlled by a different set of filters, could be used and arranged to be viewed in optical superimposition. The use of two (or three) color tubes is, however, preferred. Also, instead of merely duplicating (or triplicating) the sets of filters the receivers including the dispersive frequency spectrum analyzing means could be duplicated (or triplicated) there being one set of filters in each receiver. Again, however, the illustrative type of arrangement is preferred for obvious reasons of economy of apparatus.

Referring to Fig. 1, the display tube 6AB is scanned in a horizontal direction at a frequency $Nf_r$ and in a vertical direction at a frequency $f_r$. Thus there are N horizontal scans during one transmitter repetition period. The output from the delay line DL consists of a sequence of N signals, assuming that all the N receiver heads receive echo signals, during one transmitter repetition period, each signal being derived from a separate receiver head. These signals, which will contain frequency components dependent on the range of the target observed, are fed in this sequence to the delay line 8 which has connected to it pairs of filters in parallel, F1A and F1B, F2A and F2B, etc., the delay in the line between each pair being $$\frac{1}{N(f_2-f_1)}$$

where $f_2-f_1$=the range of beat frequencies. All the filters of each set, for example F1A, F2A, etc., pass frequencies of a band of width, for example, of $f_r$, such as shown in Fig. 2, to differing extents and the pass bands of the filters of each set are spaced apart by an amount equal to $f_r$. Thus when the first signal of the sequence, i.e. the signal derived from the first receiving head, is fed into the delay line 8 it will be delayed by a time corresponding to the delay between the input point of the delay line 8 and the pair of filters which will pass the frequency it contains, i.e. the frequency which is determined by the range of the target observed. If the target observed possesses radial motion there will exist a Doppler frequency shift, and because of the different responses of each of a given pair of filters (as shown in Fig. 2), the outputs from each filter of a pair will be of different amplitudes, and when these are detected in detectors 9A and 9B, which operate in the normal manner, two different voltages will be obtained and are used to control the color terminals of the display tube. Thus the color of the display will be dependent on the velocity of the target and the range will be dependent on the position of the indication along the horizontal trace of the tube, this distance being determined by the delay experienced in the delay line 8. Assuming the system to be properly synchronized, this indication will be on the first of the N horizontal scans of the tube, as it results from the first signal of the sequence from delay line DL, and therefore this indicates the azimuth of the target.

The second signal of the sequence, resulting from the echo signal in the second receiver head, will then enter the delay line 8 and a signal derived therefrom in the same manner as described above, will give an indication on the second horizontal scan of the tube and so on.

While we have described our invention in certain preferred embodiments we realize that modifications may be made and we desire that it be understood that no limitations upon our invention are intended except as may be imposed by the scope of the appended claims.

We claim:

1. A frequency modulated radar system comprising at least one frequency modulated transmitter adapted to transmit continuous waves which are frequency modulated in accordance with a predetermined periodic law repeating itself at a predetermined repetition frequency, a plurality (N) of differently directed receiver heads, each covering a different portion of a volume in space to be "watched," sweep oscillator means are arranged to sweep through N times the relevant beatnote frequency range thereof in one repetition period, a plurality of mixers each of which is fed with the ouptut from one of the plurality of receiver heads and with the output from the sweep oscillator means, a common delay line fed with the output from the mixers, a single output circuit, said line delivering said mixer outputs to said single output circuit with different delays for the different heads, the delays imposed on the mixer outputs corresponding to adjacent heads differing by 1/Nth of the period of said repetition frequency, a dispersive network fed from said output circuit, frequency separating means fed from said dispersive network and including a plurality of sets of filters, the filters of one set being fed in parallel with the corresponding filters of the other or others, filters fed in parallel differing in frequency response so that they will pass signals due to targets of different radial velocities relative to the system, and display means each controlled by the output from a different set of filters and adapted to produce a colored display composed of component colors each color component being controlled by the output from a different set of filters.

2. A frequency modulated radar system wherein range determined beat notes are analyzed comprising sweep oscillator means, mixer means fed with received beat notes due to targets of different radial velocity relative to the system and with the outputs from the oscillator means, a delay line, means for applying the output of said mixer to said delay line, a dispersive network fed from the output of said delay line including at least two sets of filters, said filters being connected to the output of the dispersive network, corresponding filters differing in frequency response for producing two or more signal voltages simultaneously, the ratio of frequencies of said signal voltages being dependent upon the radial velocities of the received beat notes, a two-color display tube containing separate color responsive means therein, means connecting the output of one set of said filters with one of said color responsive means, and separate means connecting the other of said color responsive means to the other set of said filters, each of said signal voltages being employed to control a different component color in said two-color display tube whereby the resultant combined color indication is dependent upon the ratio of the amplitudes of the respective signal voltages simultaneously employed, whereby said color display gives indication of the corresponding radial velocities of the targets.

References Cited in the file of this patent

UNITED STATES PATENTS

| | | |
|---|---|---|
| 2,440,301 | Sharpe | Apr. 27, 1948 |
| 2,517,549 | Earp | Aug. 8, 1950 |
| 2,597,636 | Hall et al. | May 20, 1952 |